United States Patent [19]

Machida

[11] Patent Number: 5,708,896
[45] Date of Patent: Jan. 13, 1998

[54] CAMERA HAVING A BATTERY AND A STROBE CONDENSER THEREIN

[75] Inventor: Katsuki Machida, Tokyo, Japan

[73] Assignee: Asahi Kogaku Kogyo Kabushiki Kaisha, Tokyo, Japan

[21] Appl. No.: 703,018

[22] Filed: Aug. 26, 1996

[30] Foreign Application Priority Data

Sep. 7, 1995 [JP] Japan .................................. 7-230282

[51] Int. Cl.⁶ .............................. G03B 17/02; G03B 15/03
[52] U.S. Cl. .......................... 396/535; 396/176; 396/539; 396/540
[58] Field of Search ..................... 396/176, 177, 396/178, 205, 206, 301, 535, 538, 539, 540, 420, 424

[56] References Cited

U.S. PATENT DOCUMENTS

| | | | |
|---|---|---|---|
| 4,771,303 | 9/1988 | Matsumoto et al. | 396/535 |
| 5,001,505 | 3/1991 | Tosaka et al. | 396/535 |
| 5,486,887 | 1/1996 | Omiya | 396/176 |
| 5,555,061 | 9/1996 | Soshi et al. | 396/535 |

*Primary Examiner*—A. A. Mathews
*Attorney, Agent, or Firm*—Greenblum & Bernstein P.L.C.

[57] ABSTRACT

A camera having a strobe and a strobe condenser electrically connected to the strobe. The strobe condenser consists of a plurality of condensers, some of which are accommodated in a grip portion integrally formed with a camera body of the camera. The remainder of the plurality of condensers are accommodated outside the grip portion in the camera body.

27 Claims, 5 Drawing Sheets

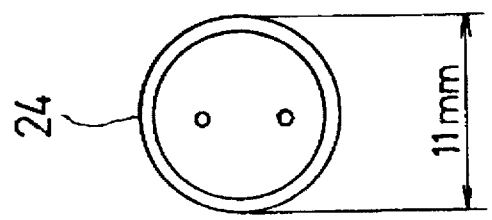
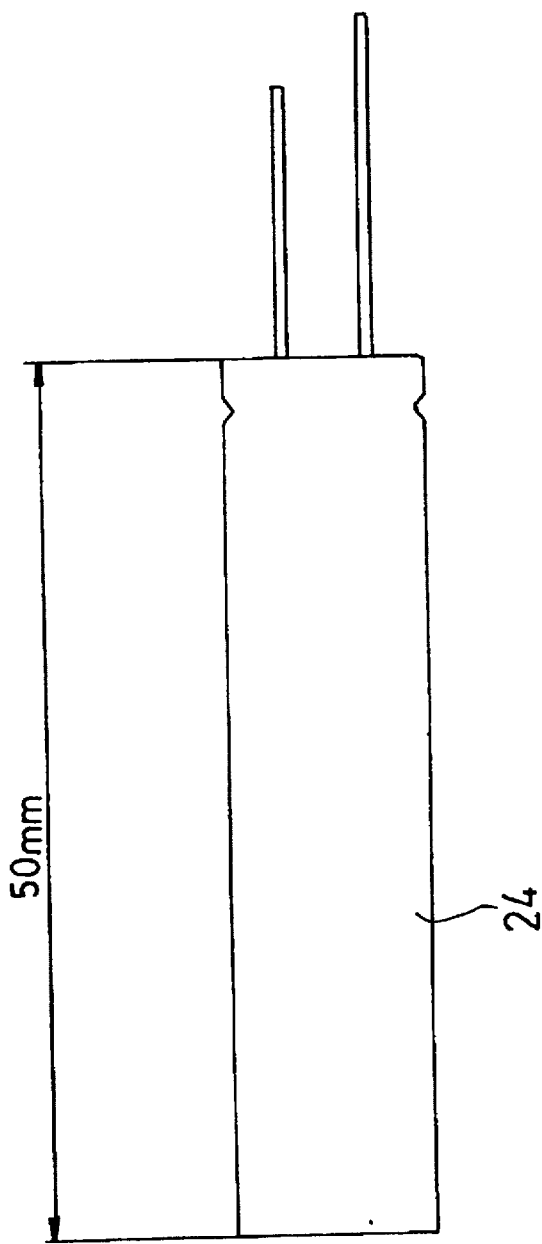

CAMERA HAVING A BATTERY AND A STROBE CONDENSER THEREIN

BACKGROUND OF THE INVENTION

1. Field of the Invention

The present invention relates to a camera provided therein with a battery for use as a power source of the camera and a plurality of strobe condensers used for a built-in strobe of the camera.

2. Description of the Related Art

Most cameras produced in recent years have been provided with a built-in strobe. Using a built-in strobe, a photographer can take pictures quickly and conveniently. Such a type of camera is generally provided with a strobe condenser which serves as a power source for the built-in strobe. In addition, recent cameras have adopted a structure in which both the strobe condenser and a battery, serving as a power source for the camera, are accommodated inside a grip portion integrally formed with the camera body. The grip portion is gripped by a photographer during photographing.

Formerly, in a camera having both a strobe condenser and a battery accommodated in the grip portion of the camera, the grip portion tends to be too large for a person having small hands to firmly hold the grip, especially in the case of children or female users.

SUMMARY OF THE INVENTION

It is an object of the present invention to provide a camera which has a built-in strobe and a grip portion formed integral therewith, the camera having a structure for space-efficiently accommodating both a battery and a strobe condenser provided in the camera, so that even a user having small hands can easily and firmly hold the grip portion of the camera, without increasing the size of the camera.

According to an aspect of the present invention, there is provided a camera having a strobe and a strobe condenser electrically connected to the strobe. The strobe condenser consists of a plurality of condensers, some of which are accommodated in a grip portion integrally formed with a camera body of the camera. The rest of the plurality of condensers are accommodated outside the grip portion in the camera body.

With this arrangement, since the condenser necessary for the built-in strobe is divided into a plurality of condensers, only some of which are accommodated in the grip portion, a compact camera having a small grip that can be easily and firmly gripped by a user having small hands can be provided.

Preferably, some of the plurality of condensers are accommodated in the grip portion such that the some of the plurality of condensers extend in a longitudinal direction of the grip portion.

Preferably, a battery for supplying electricity to the strobe condenser is accommodated in the grip portion.

The plurality of condensers preferably consists of a first condenser and a second condenser. The first condenser and the battery are accommodated in the grip portion. The second condenser is accommodated outside the grip portion in the camera body.

The battery may consist of two cylindrical cells of the same type.

According to another aspect of the present invention, a camera is provided with a built-in strobe and a plurality of strobe condensers electrically connected to the built-in strobe and accommodated in a camera body of the camera. At least one of the plurality of strobe condensers is shorter than another of the plurality of strobe condensers in a vertical direction of the camera.

According to yet another aspect of the present invention, a camera having a built-in strobe, a bulged grip portion and a plurality of strobe condensers, is provided. Some of the plurality of condensers and a battery are accommodated in the grip portion.

The present disclosure relates to subject matter contained in Japanese Patent Application No. 7-230282 (filed on Sep. 7, 1995) which is expressly incorporated herein by reference in its entirety.

BRIEF DESCRIPTION OF THE DRAWINGS

The invention will be described below in detail with reference to the accompanying drawings, in which similar members are indicated by similar reference numerals, and wherein:

FIGS. 6A and 6B are plan views of another strobe condenser used for the camera shown in FIG. 1 or 3.

DESCRIPTION OF THE PREFERRED EMBODIMENTS

Figure 1:
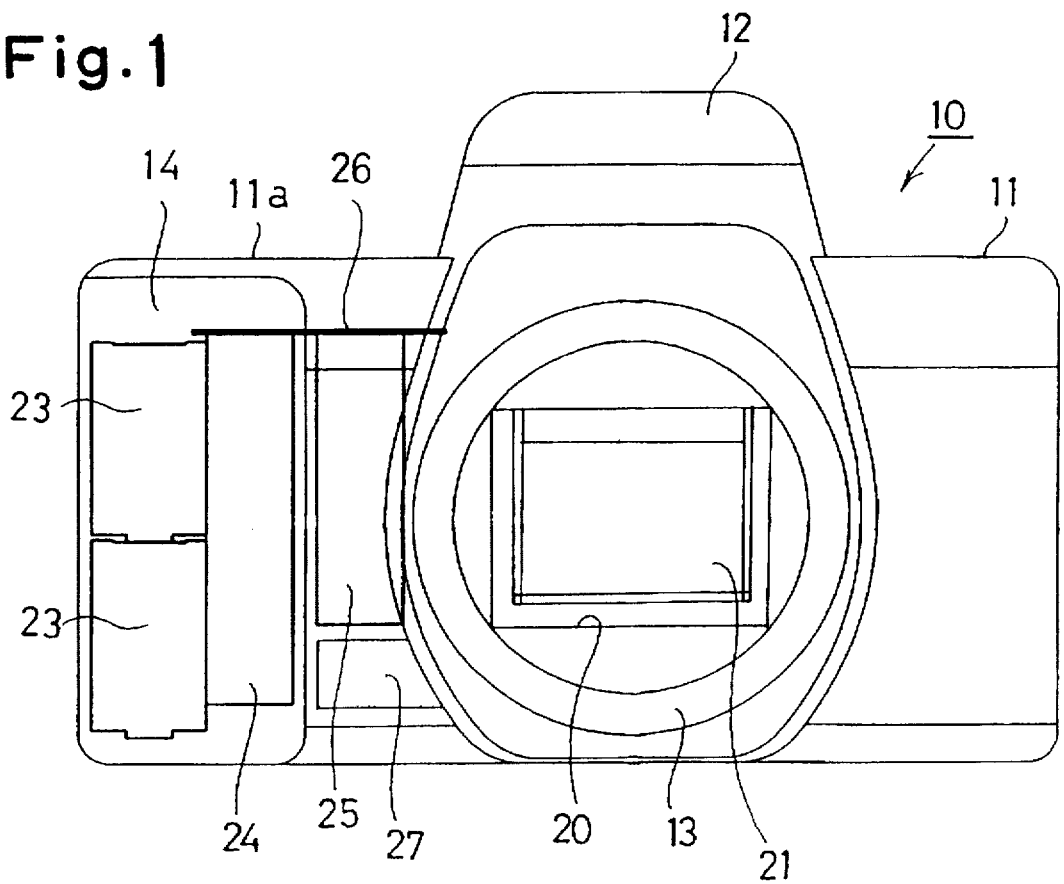
FIG. 1 is a front elevational view of a camera of a first embodiment.
Figure 2:
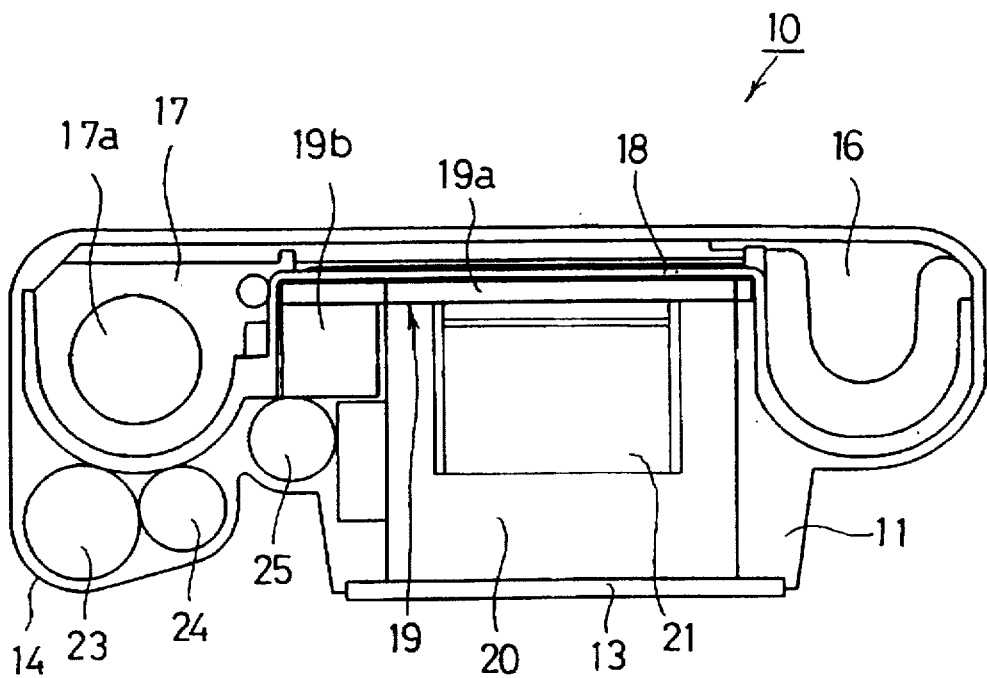
FIG. 2 is a cross-sectional view of the camera shown in FIG. 1.

FIGS. 1 and 2 show a camera 10 of the first embodiment. The camera 10 is an SLR camera having a built-in strobe 12. The built-in strobe 12 is of a retractable type that is provided at approximately a center of the top of the camera 10. The built-in strobe 12 is provided therein with an electronic tube or a xenon flash lamp 31 (shown in FIG. 7) for emitting flashlight. The xenon flash lamp 31 is not illustrated in FIG. 1 since the built-in strobe 12 is in its retracted state.

A camera body 11 of the camera 10 is provided, approximately at the center of the front surface thereof, with a lens mount ring 13 on which a photographic lens (not shown) is detachably attached. The camera body 11 is also provided on one side thereof (left side as viewed in FIG. 1) with a grip portion 14 to be gripped or held by a photographer. A shutter release button (not shown) is provided at an appropriate position at the top of the grip portion 14.

A film chamber 16 and a spool chamber 17 are respectively formed in the camera body 11 in the right hand side and left hand side thereof, as viewed in FIG. 2. A film take-up spool 17a is rotatably supported in the spool chamber 17. An aperture frame 18 is fixed to the camera body 11 between the film chamber 16 and the spool chamber 17. The aperture frame 18 has a rectangular-shaped aperture (not shown) which limits the size of each picture frame exposed. A shutter unit 19 is fixed to the camera body 11 between the film chamber 16 and the spool chamber 17. The shutter unit 19 includes a focal plane shutter unit 19a and a shutter drive unit 19b. The focal plane shutter unit 19a is disposed immediately in front of the aperture frame 18. The shutter drive unit 19b drives a plurality of shutter blades (not shown) of the focal plane shutter unit 19a.

A mirror box 20 is fixed to the camera body 11 in front of the focal plane shutter unit 19a. A quick-return mirror 21 is rotatably held in the mirror box 20.

The camera 10 uses two cells 23 as a battery. Each cell 23 is of a specific type, namely "CR2", i.e., one of the cylindrical-shaped lithium type batteries that is widely available. The two cells 23 are accommodated in the grip portion 14 such that they are directly connected in series through a common central axis. The common central axis of the cells 23 extends in the vertical direction of the camera 10, as shown in FIG. 1. The longitudinal direction (vertical direction as viewed in FIG. 1) of the grip portion 14 extends in the vertical direction of the camera 10. Therefore, the common central axis of the cells 23 extends in the vertical direction of the grip portion 14.

An openable battery chamber lid (not shown) is provided at the bottom of the grip portion 14, so that the cells 23 can be taken out of, or inserted into, the camera body 11 when the battery chamber lid is opened.

Figure 7:
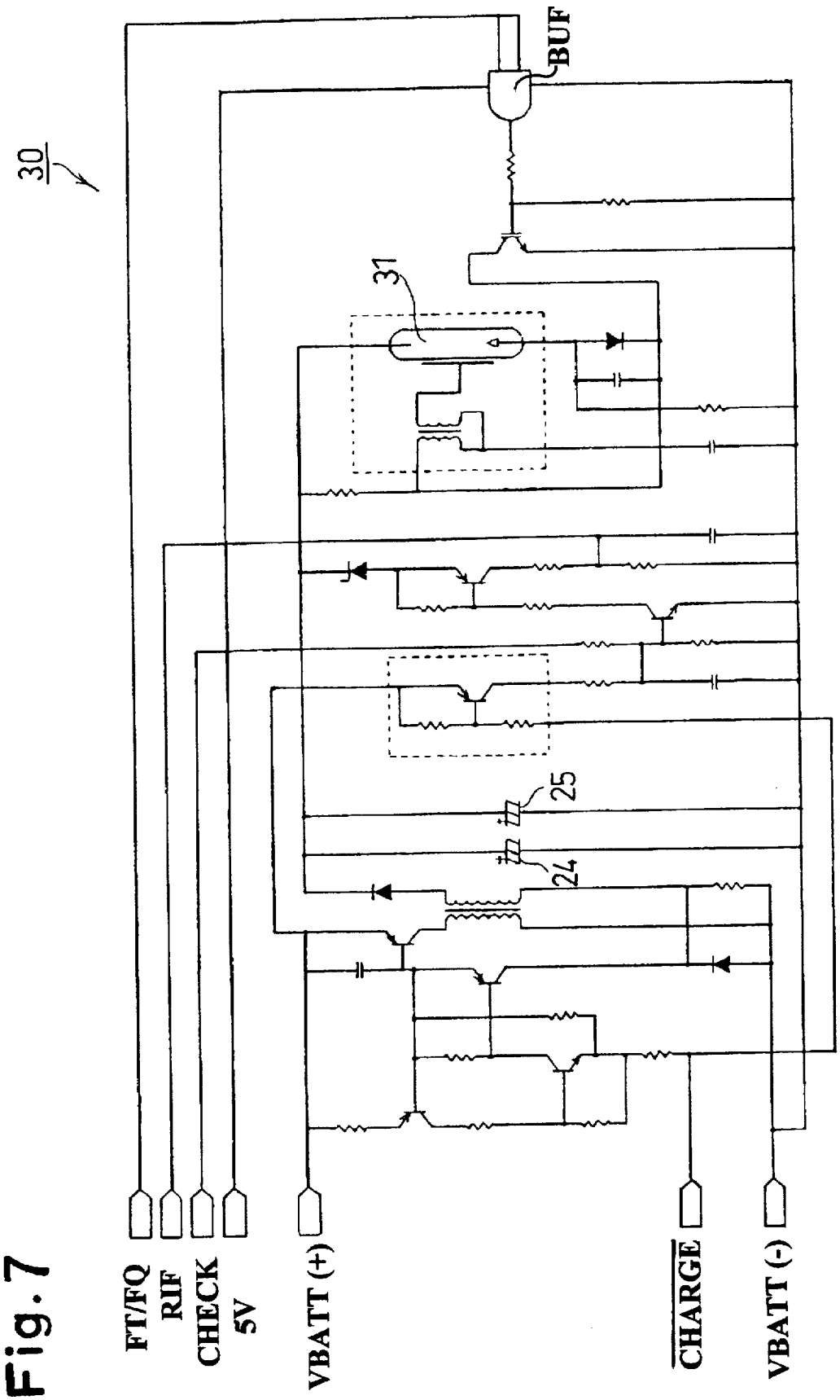
FIG. 7 is a circuit diagram of a strobe circuit provided in the camera shown in FIG. 1 or 3.

The camera 10 is provided with a first condenser 24 and a second condenser 25 which are electrically connected to each other in parallel, as shown in a strobe circuit diagram 30 shown in FIG. 7. Both the condensers 24, 25 are electrically connected to the strobe tube housed in the built-in strobe 12. Each condenser 24, 25 is a cylindrical-shaped condenser and extends in the longitudinal direction of the grip portion 14, i.e., in the vertical direction of the camera 10. The diameters of both of the condensers 24, 25 are identical to each other, however the first condenser 24 is longer than the second condenser 25 in the vertical direction of the camera 10, as shown in FIG. 1. Therefore, the capacity of the first condenser 24 is greater than that of the second condenser 25.

A strobe circuit board 26, extending parallel to an upper wall 11a of the camera body 11, is located above the spool chamber 17 and the cells 23 in the camera body 11. The upper end of each condenser 24, 25 is directly connected to and mounted on the strobe circuit board 26. The upper wall 11a extends in the horizontal direction of the camera 10, i.e., the horizontal direction of FIG. 1.

The first condenser 24 is accommodated in the grip portion 14 such that the first condenser 24 extends in the vertical direction of the camera 10, that is, in the longitudinal direction of the grip portion 14, with the first condenser 24 positioned immediately next to the two cells 23. The second condenser 25 is accommodated in the camera body 11 at a position outside of the grip portion 14. More specifically, the second condenser 25 is positioned in the camera body 11 between the grip portion 14 and the mirror box 20, immediately in front of the shutter drive unit 19b.

A motor 27 for driving the quick-return mirror 21 is positioned in the camera body 11 below the second condenser 25.

In a conventional camera having a built-in strobe, the grip portion of the camera is generally large in size since a single large strobe condenser and a battery are accommodated in the grip portion of the camera. However, in the camera 10 of the first embodiment, the strobe condenser necessary for the built-in strobe 12 consists of two cylindrical condensers, namely, the first and second condensers 24, 25 connected in parallel to each other. Further, one of the two condensers 24, 25 is accommodated in the camera body 11 in the grip portion 14 together with the battery, namely, the cells 23, while the other of the two condensers is placed in the camera body 11 outside of the grip portion 14. In the case where a single cylindrical condenser is substituted by two cylindrical condensers, each of the two cylindrical condensers is usually smaller than the single cylindrical condenser in diameter on the condition that the capacity of the single cylindrical condenser is identical to the total capacity of the two cylindrical condensers. Therefore, in the camera 10, the grip portion thereof is successfully constructed smaller than a conventional grip portion since two separate condensers are provided for the built-in strobe 12, and one of the two condensers, i.e. the first condenser 24, is accommodated in the grip portion 14 together with the cells 23.

Moreover, due to the above-noted structure in which the first condenser 24 and the second condenser 25 (shorter than the first condenser 24) are both affixed to the strobe circuit board 26, room for accommodating the motor 27 for driving the quick-return mirror 21 is successfully and space-efficiently formed in the camera body 11 below the second condenser 25, as shown in FIG. 1. In other words, in the camera 10, the second condenser 25 is intentionally made shorter than the first condenser 24. With such a structure the second condenser 25 can be accommodated in the camera body 11 above the motor 27 in a space-efficient manner. With such a space-efficient arrangement in which the strobe condenser necessary for the built-in strobe 12 is provided as two separate condensers, the camera 10 is successfully constructed small and compact.

Figure 3:
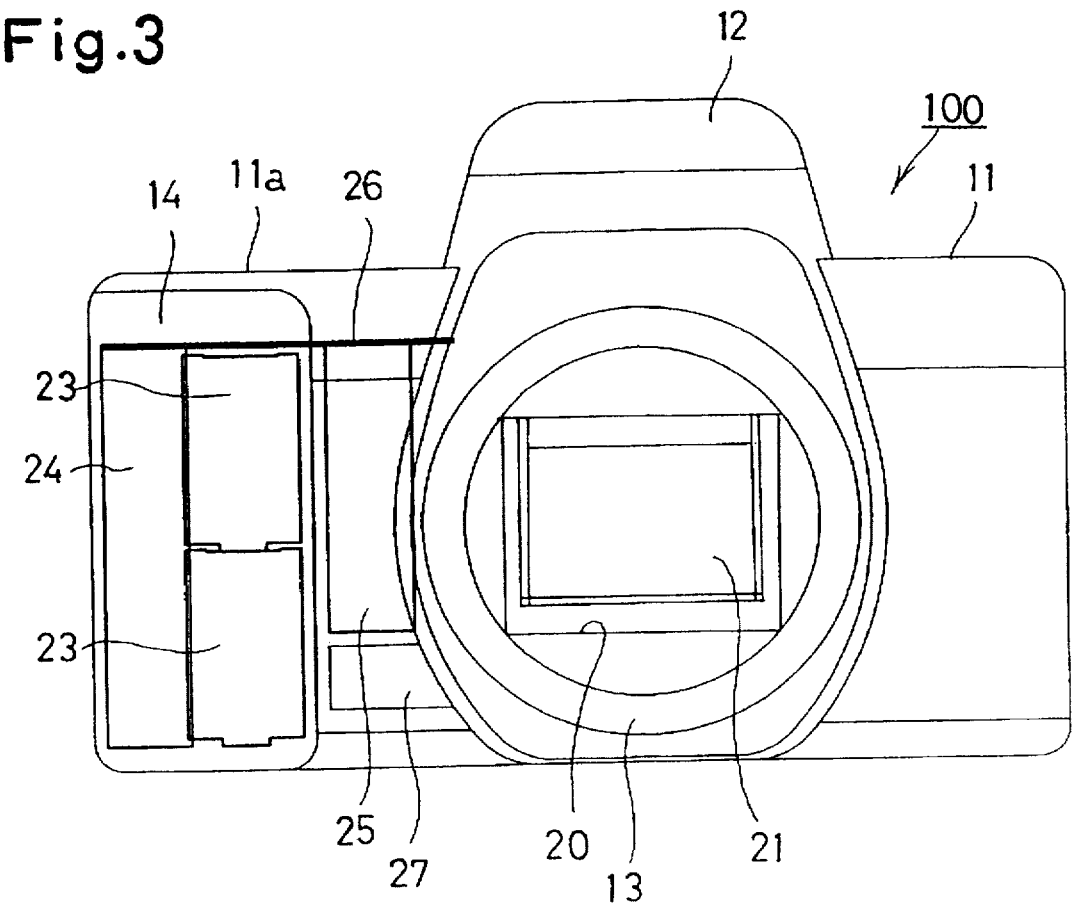
FIG. 3 is a front elevational view of a camera of a second embodiment.
Figure 4:
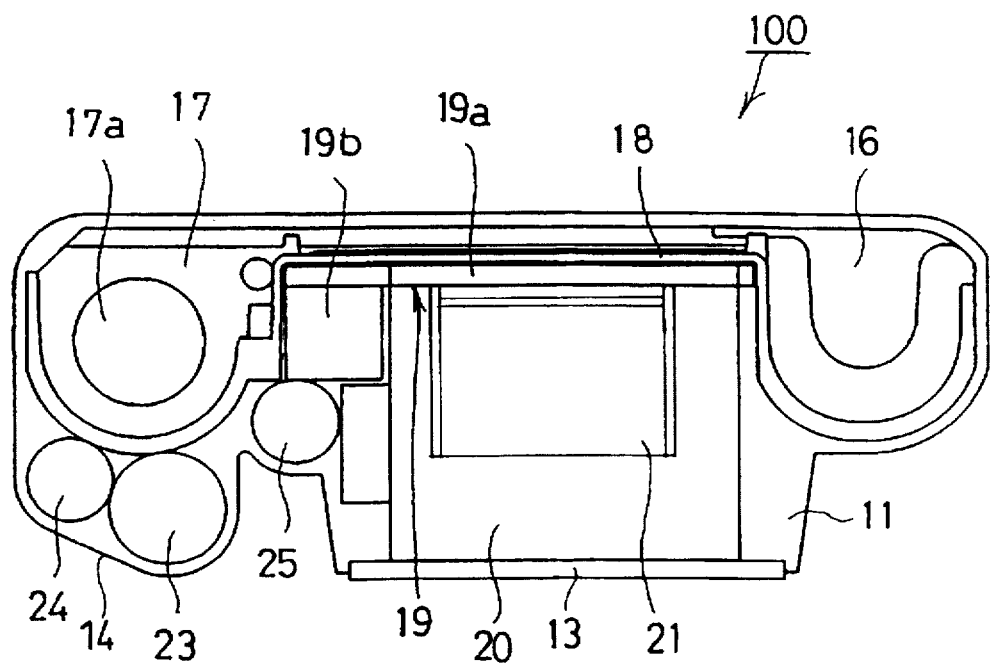
FIG. 4 is a cross-sectional view of the camera shown in FIG. 3.
Figure 5:
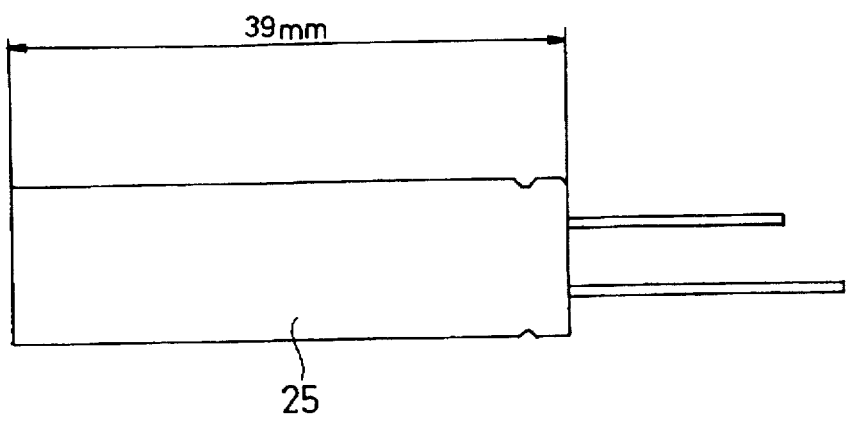
FIGS. 5A and 5B are plan views of a strobe condenser used for the camera shown in FIG. 1 or 3.
Figure 5:
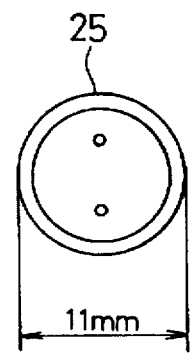

FIGS. 3 and 4 show a camera 100 of the second embodiment. The camera 100 is identical to the camera 10 of the above-noted first embodiment except that the position of the cells 23 and the first condenser 24 is inverted in the second embodiment, that is, the cells 23 and the first condenser 24 are respectively placed in the left and right hand sides in the grip portion 14 in the camera 10 of the first embodiment whereas the cells 23 and the first condenser 24 are respectively placed in the right and left hand sides in the grip portion 14 in the camera 100 of the second embodiment. The same effects can also be appreciated in the camera 100 of the second embodiment.

Although the two cylindrical condensers, namely, the first and second condensers 24, 25 serve as a strobe condenser necessary for the built-in strobe 12 in each of the above first and second embodiments, more than two cylindrical condensers connected in parallel to one another may be used instead. In such a case, e.g., a case where three cylindrical condensers are used, one of the three condensers may be accommodated in the grip portion 14 together with the cells 23 while the other two condensers may be accommodated outside of the grip portion 14 in the camera body 11.

In each of the first and second embodiments, the two cells 23, namely, two CR2s serve as a battery for the camera 10 or 100. However, the two cells used in the camera 10 or 100 are not limited to only two cells of the specific type, i.e., CR2. Two cells of a different type each having a similar shape and capacity to those of CR2 may be used instead. Further, in the case of a single cell having a similar shape to the combined whole shape of the two CR2s when directly connected in series to each other, as shown in FIG. 1 or 2, and having a capacity identical to the total capacity of the two CR2s, being manufactured in the future, that single cell may be used for the camera 10 or 100 in place of the two CR2s.

In each of the first and second embodiments, although the motor 27 is positioned in the space formed below the second condenser 25, another member other than the motor 27 may be positioned in the space formed below the second condenser 25.

As can be seen from the foregoing, according to the first or second embodiment, since the condenser necessary for the built-in strobe is divided into a plurality of condensers, only some of which are accommodated in the grip portion, a compact camera having a small grip that can be easily and firmly gripped by a user having small hands can be provided.

What is claimed is:

1. A camera having a strobe and a strobe condenser electrically connected to said strobe, wherein said strobe condenser comprises a plurality of condensers, at least one of said plurality of condensers being accommodated in a grip portion integrally formed with a camera body of said camera, and a remainder of said plurality of condensers being accommodated outside said grip portion in said camera body.

2. The camera according to claim 1, wherein said at least one of said plurality of condensers are accommodated in said grip portion such that said at least one of said plurality of condensers extend in a longitudinal direction of said grip portion.

3. The camera according to claim 1, further comprising a battery for supplying electricity to said strobe condenser, said battery being accommodated in said grip portion.

4. The camera according to claim 1, wherein said plurality of condensers are electrically connected to one another in parallel.

5. The camera according to claim 1, wherein each of said plurality of condensers is formed in a cylindrical shape.

6. The camera according to claim 5, wherein diameters of said plurality of condensers are identical to one another.

7. The camera according to claim 6, wherein at least one of said remainder of said plurality of condensers is shorter than any one of said at least one of said plurality of condensers.

8. The camera according to claim 7, wherein said camera is an SLR camera having a quick-return mirror and a motor for driving said quick-return mirror, said at least one of said remainder of said plurality of condensers being accommodated above said motor.

9. The camera according to claim 3, wherein said plurality of condensers comprises a first condenser and a second condenser, said first condenser and said battery being accommodated in said grip portion, and said second condenser being accommodated outside said grip portion in said camera body.

10. The camera according to claim 9, further comprising a shutter unit provided in said camera body, said second condenser being accommodated adjacent to a shutter unit provided in said camera body.

11. The camera according to claim 9, wherein longitudinal directions of said first and second condensers are each parallel to a longitudinal direction of said grip portion.

12. The camera according to claim 11, wherein said second condenser is shorter than said first condenser in said longitudinal direction of said grip portion.

13. The camera according to claim 12, wherein diameters of said first and second condensers are identical to each other, so that said first condenser has a larger capacity than a capacity of said second condenser.

14. The camera according to claim 13, wherein said camera is an SLR camera having a quick-return mirror and a motor for driving said quick-return mirror, said second condenser being accommodated above said motor.

15. The camera according to claim 3, wherein said battery comprises two cylindrical cells of a same type which are directly connected to each other in series.

16. The camera according to claim 15, wherein said two cylindrical cells are each of a type CR2.

17. The camera according to claim 15, wherein said two cylindrical cells are each of a type similar to a type CR2.

18. The camera according to claim 9, wherein said battery comprises two cylindrical cells of a same type which are directly connected to each other in series, wherein said first condenser has a cylindrical shape, and further wherein said two cylindrical cells and said cylindrical-shaped first condenser are accommodated adjacent to each other in said grip portion such that a common central axis of said two cylindrical cells and a central axis of said cylindrical-shaped first condenser are parallel to each other.

19. The camera according to claim 18, wherein said two cylindrical cells are each of a type CR2.

20. The camera according to claim 18, wherein said two cylindrical cells are each of a type similar to a type CR2.

21. The camera according to claim 1, further comprising a strobe circuit board provided in said camera body, each of said plurality of condensers being fixed to said strobe circuit board.

22. The camera according to claim 14, wherein said quick-return mirror is rotatably Supported in a mirror box fixed to said camera body, said second condenser being accommodated between said mirror box and said grip portion.

23. The camera according to claim 1, wherein said camera is an SLR camera.

24. The camera according to claim 1, wherein said camera is a lens-shutter type camera.

25. The camera having a strobe and a strobe condenser according to claim 1, said grip portion extending forwardly of said camera body, a forwardly opening recess defined between said grip portion and a further portion of said camera body.

26. The camera having a strobe and a strobe condenser according to claim 1, said grip portion extending forwardly of a film roll receiving space provided within said camera body.

27. The camera having a strobe and a strobe condenser according to claim 1, said grip portion having a thickness dimension greater than a thickness dimension of a portion of said camera body at which said grip portion is not formed.

* * * * *

UNITED STATES PATENT AND TRADEMARK OFFICE
CERTIFICATE OF CORRECTION

PATENT NO. : 5,708,896
DATED : January 13, 1998
INVENTOR(S) : K. MACHIDA

It is certified that error appears in the above-identified patent and that said Letters Patent is hereby corrected as shown below:

On the cover page,
Item [56] References Cited, U.S. PATENT DOCUMENTS, line 9, insert the following:

--- 4,863,812  9/1989   Ueda et al.
    5,036,343  7/1991   Yamanaka
    5,077,572  12/1991  Morisawa
    5,079,584  7/1992   Nakamura
    5,150,140  9/1992   Kitazawa---.

On the cover page,
Item [56] References Cited, after all of the U.S. patent documents, insert the following:

--- FOREIGN PATENT DOCUMENTS
    2,235,056  2/1991   United Kingdom
    2,146,644  4/1985   United Kingdom
    2,083,300  3/1982   United Kingdom---.

Signed and Sealed this

Thirteenth Day of July, 1999

Attest:

Attesting Officer

Q. TODD DICKINSON

Acting Commissioner of Patents and Trademarks